United States Patent [19]

Hatanaka et al.

[11] 4,120,813

[45] Oct. 17, 1978

[54] HYGROSCOPIC RESIN AND HUMIDITY SENSOR USING THE SAME

[75] Inventors: Hideo Hatanaka; Yoshinobu Murakami, both of Katano; Kazuhisa Morimoto, Settsu, all of Japan

[73] Assignee: Matsushita Electric Industrial Co., Ltd., Japan

[21] Appl. No.: 797,117

[22] Filed: May 16, 1977

[51] Int. Cl.$^2$ ............................................. C09K 3/00
[52] U.S. Cl. ................................. 252/194; 526/263; 526/264; 526/273
[58] Field of Search ................. 252/194; 526/264, 263

[56] References Cited

U.S. PATENT DOCUMENTS

| | | | |
|---|---|---|---|
| 3,545,622 | 12/1970 | Sakhnovsky et al. | ........... 252/194 X |
| 4,041,437 | 8/1977 | Matsuura et al. | ................ 252/194 X |

*Primary Examiner*—Stephen J. Lechert, Jr.
*Attorney, Agent, or Firm*—Wenderoth, Lind & Ponack

[57] ABSTRACT

There is provided a hygroscopic resin comprising a vinyl polymer having an epoxy group, said vinyl polymer being a copolymerization product between a vinyl monomer having a hydrophilic property and a further vinyl monomer having an epoxy group. This hygroscopic resin is not soluble in water or organic solvent and is thus useful for various applications, e.g., a humidity sensor can be made by dispersing a conductive powder in the hygroscopic resin. This humidity sensor has high sensitivity to humidity and can operate stably for a long time.

4 Claims, 2 Drawing Figures

HYGROSCOPIC RESIN AND HUMIDITY SENSOR USING THE SAME

This invention relates to a hygroscopic resin, particularly to a hygroscopic resin having an epoxy group, and also to a humidity sensor using the hygroscopic resin.

Various high molecular compounds are known to have hygroscopic properties. However, most of them have excessively high hydrophilic properties, and thus are soluble in water, as represented, e.g., by polyacrylamide, polyvinylpyrrolidone and polyvinylalcohol.

A resin which is not soluble in water or organic solvents and which is highly hygroscopic is highly desired because such resin can advantageously be used as a material to absorb humidity, for new applications such as wall boards, ceiling boards, floor boards, resinous materials having antistatic properties, and humidity sensors.

It is an object of this invention to provide a hygroscopic resin which is not soluble in water or organic solvents and which is highly hydroscopic. This object is achieved by providing a hygroscopic resin comprising a vinyl polymer having an epoxy group, the vinyl polymer being a copolymerization product between (a) a hydrophylic vinyl monomer and (b) a further vinyl monomer having an epoxy group.

It is another object of this invention to provide a humidity sensor which has high sensitivity to humidity and which can operate stably for a long time. This object is achieved by providing a humidity sensor comprising a hygroscopic resin having a conductive powder dispersed therein, the hygroscopic resin comprising at least one member selected from the group consisting of (i) a copolymerization product between (a) a member selected from the group consisting of a hydroxy-lower alkyl acrylate and a hydroxy-lower alkyl methacrylate and (b) a member selected from the group consisting of glycidyl acrylate and glycidyl methacrylate, and (ii) a further copolymerization product between (a) a member selected from the group consisting of hydroxy-lower alkoxy-lower alkyl acrylate and hydroxy-lower alkoxy-lower alkyl methacrylate and (b) a member selected from the group consisting of glycidyl acrylate and glycidyl methacrylate.

These objects and other features of this invention will become apparent from the following detailed description taken in conjunction with the accompanying drawings, in which:

FIG. 1 (B) is a schematic cross-sectional view of the device of FIG. 1 (A) cut by the line X—X' of FIG. 1 (A)

Figure 1:
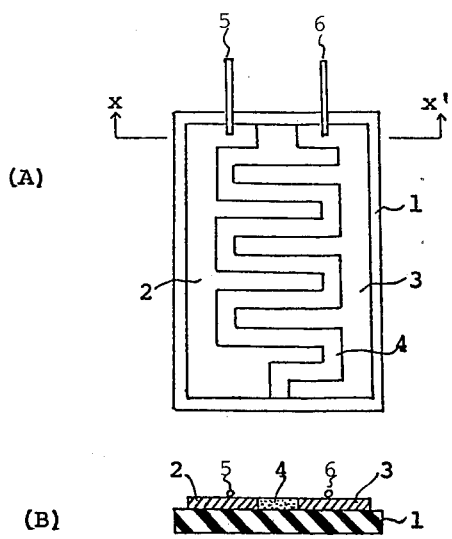
FIG. 1 (A) is a schematic top plan view of a humidity sensing device using a humidity sensor according to this invention.

One of the features of the hygroscopic resin of this invention is that it has an epoxy group introduced therein by the copolymerization of two kinds of vinyl monomers. Due to the existence of the epoxy group, the hygroscopic resin can be easily hardened by mere heating and/or by merely adding a cross-linking reagent. Further, by varying the compositional ratios in the copolymerization product, hygroscopic resins having various hygroscopic properties suitable for various applications can be obtained.

One component of the hygroscopic resins, i.e., the hydrophylic vinyl monomers which can be used for making the hygroscopic resin of this invention include hygroscopic acrylic esters, hygroscopic methacrylic esters, acrylamides, hygroscopic vinylpyrrolidones. Preferred examples of the hygroscopic acrylic esters are hydroxy-lower alkyl acrylates and hydroxy-lower alkoxy-lower alkyl acrylates. More preferred vinyl monomers among these hydroscopic acrylic ester compounds are 2-hydroxyethyl acrylate, diethyleneglycol monoacrylate, 2-hydroxypropyl acrylate, 3-hydroxypropyl acrylate, triethyleneglycol monoacrylate and dipropyleneglycol monoacrylate.

Preferred examples of the hydroscopic methacrylic esters are hydroxy-lower methacrylates and hydroxy-lower alkoxy-lower alkyl methacrylates. More preferred vinyl monomers among these hygroscopic methacrylic ester compounds are 2-hydroxyethyl methacrylate, diethyleneglycol monomethacrylate, 2-hydroxypropyl methacrylate, 3-hydroxypropyl methacrylate, triethyleneglycol monomethacrylate and dipropyleneglycol monomethacrylate.

Preferred examples of the acrylamide compounds are acrylamide, methacrylamide, N-methylolacrylamide, N-methylolmethacrylamide, diacetoneacrylamide and diacetonemethacrylamide. Preferable examples of the N-vinylpyrrolidone compounds are N-vinylpyrrolidone and 2-methyl-N-vinylpyrrolidone.

Preferred examples of the vinyl monomers having epoxy groups are glycidyl acrylate, glycidyl methacrylate and glycidyl p-vinylbenzoate.

By copolymerizing the vinyl monomer having a hydrophilic property and the further vinyl monomer having an epoxy group with the aid of a usual catalyst for radical polymerization (such as azobisisobutyronitrile, benzoyl peroxide, dicumyl peroxide and cumene hydroperoxide), a desired hygroscopic resin can be obtained. The hygroscopic property of the hygroscopic resin can be varied by appropriately selecting the two vinyl monomers, or by varying the compositional ratios in the copolymerization product (i.e., the amounts of the two vinyl monomers), or by varying the kind and/or amount of the cross-linking reagent, or by the combination of these three methods.

It has been found that the amount of the vinyl monomer, having an epoxy group, to be copolymerized with the vinyl monomer having a hydrophilic property is preferably between 1 and 30 mole %, more preferably between 3 to 20 mole %, on the basis of the sum of the two vinyl monomers. If the amount of the vinyl monomer having an epoxy group (e.g., glycidyl acrylate of glycidyl methacrylate) is too small, it does not provide the desired effect. For example, the resultant hydroscopic resin may have excessive hysteresis of moisture absorption-release characteristics and have a too short a life, just as in the case when the hygroscopic resin is composed, e.g., of 2-hydroxyethyl methacrylate only. On the other hand, if the amount of the vinyl monomer having an epoxy group is excessive, the resultant hygroscopic resin may exhibit too slow a response to the humidity change.

The cross-linking in the hygroscopic resin made by this invention can be easily carried out by using, as a cross-linking reagent, a usual hardening reagent used for hardening usual epoxy resin. However, the hygroscopic resin can also be easily made to have cross-linking and insolubility (to water or organic solvents) by mere heating at a temperature between 100 and 150° C. for a time period between 10 and 90 minutes, even without the use of a cross-linking reagent. This is because the hydroxy groups, amide groups, etc., which are present in the hygroscopic resin and which are hydrophilic, function as a catalyst for the cross-linking reaction by the epoxy group in the hygroscopic resin. If a cross-linking reagent is used, the amount thereof is preferably between 0.1 and 50 weight parts on the basis of 100 weight parts of the hygroscopic resin.

This invention also provides a humidity sensor. The humidity sensor of this invention comprises a hygroscopic resin of this invention having a conductive powder dispersed therein.

Various resins having conductive powders dispersed therein have conventionally been used as electrically conductive materials or electrical resistor materials. It is known that these materials change in the electrical resistivity when they are placed in a humid atmosphere and thus they act as humidity sensors, because the resins absorb or release moisture in the humid atmosphere, and thereby the contact resistances between adjacent conductive powder particles dispersed in each resin effectively vary. It has conventionally been tried, by using these materials, to make a humidity sensor usable for the purpose of ambient humidity control. However, such conventional humidity sensors do not have sufficiently high sensitivity to ambient humidity and sufficiently high stability in operation over a long period of time.

It has been found according to this invention that by dispersing a conductive powder in the above described novel hygroscopic resin, an excellent humidity sensor can be obtained. Preferred hygroscopic resin for the humidity sensor comprise (i) a copolymerization product of a hydroxy-lower alkyl acrylate (or hydroxy-lower alkyl methacrylate) and glycidyl acrylate (or glycidyl methacrylate) and/or (ii) a further copolymerization product of hydroxy-lower alkoxy-lower alkyl acrylate (or hydroxy-lower alkoxy-lower alkyl methacrylate) and glycidyl acrylate (or glycidyl methacrylate) as mentioned above.

In the thus made humidity sensor, the hygroscopic resin effectively absorbs and releases moisture in the ambient humidity, whereby the contact resistances between conductive powder particles effectively vary to cause the humidity sensor to exhibit a high sensitivity to humidity and a high stability in operation for a long time. More specifically, the hygroscopic resin in the humidity sensor of this invention can absorb higher moisture and exhibits smaller hysteresis of moisture absorption-release characteristics and is quicker in moisture absorption-release operation than conventional hygroscopic resins. Further, the hygroscopic resin in the humidity sensor according to this invention exhibits higher thermal stability and a higher stability in the humidity sensing operation than the conventional hygroscopic resins.

The humidity sensor according to this invention is made, e.g., by dissolving the novel hygroscopic resin in a solvent such as methyl cellosolve, dimethylformamide and methanol, thoroughly dispersing a conductive powder such as carbon, e.g., graphite carbon or amorphous carbon, and metal, e.g., silver or gold, in the solution, coating the thus treated solution on an electrode-bearing surface of an insulating substrate, and heating the coating so as to evaporate the solvent and promoting the cross-linking in the hygroscopic resin. Thereby the solid suspension humidity sensor is made. If necessary, a hardening reagent for hardening conventional epoxy resins can be added to the solution of the hygroscopic resin and the solvent, so as to make the resultant solid suspension more quickly and to promote the cross-linking in the resultant solid suspension. As for the electrodes on the insulating substrate, a conductive paint or a usual electrode material can be used. The resistivity of the humidity sensor can be controlled by the amount of the conductive powder to be dispersed in the hygroscopic resin. The preferred amount of the conductive powder to be added is 30 to 100 weight parts on the basis of 100 weight parts of the hygroscopic resin.

This invention will more readily be understood with reference to the following Examples, but these Examples are intended only to illustrate this invention, and are not to be construed as limitative.

EXAMPLE 1

37 grams of 2-hydroxyethyl methacrylate and 4 grams of glycidyl methacrylate (molar ratio being 10:1) were dissolved in 160 grams of methyl cellosolve in a 300 ml flask provided with a cooling tube, a stirrer, a thermometer and an inlet for introducing nitrogen gas. 0.29 Gram of azobisisobutyronitrile, as a catalyst for polymerization, was added to the solution. The solution was subjected to copolymerization reaction by introducing nitrogen gas to the solution and stirring the solution at a temperature of 80° C. for 5 hours. The thus treated solution was poured into ethyl ether so as to precipitate the copolymerization product. The thus precipitated copolymerization product was purified in methanol-ethyl ether by reprecipitation, and was then dried at room temperature under reduced pressure, whereby a white colored solid polymer was obtained. The epoxy value of the thus made polymer was 0.064.

The thus made polymer was dissolved in methyl cellosolve to make a methyl cellosolve solution containing the polymer of 10%. This methyl cellosolve solution was coated on a glass plate by using a 4 mil thick blade, and was then heated at 100° C. for 1 hour, whereby a hygroscopic resin film of a thickness of 4 to 5 μm was obtained. The thus obtained film was subjected to the measurement of hydrophilicity coefficient for saturation by keeping the temperature at 20° C. and varying the relative humidity. The hydrophilicity coefficient for saturation was calculated by using the following equation:

$$H_{CS} = [(W_1/W_0) - 1] \times 100 \, (\%)$$

where $H_{CS}$ is the hydrophilicity coefficient for saturation, and $W_1$ and $W_0$ are weights of the film after and before the film was placed under the relative humidity (i.e., the film absorbed moisture), respectively. The results of the measurements represented by the calculated values are shown in Table 1, where R. H. represents relative humidity.

EXAMPLE 2

A hygroscopic resin of a white colored polymer was made in a manner quite similar to that of Example 1, except that here the amounts of 2-hydroxyethyl methacrylate and glycidyl methacrylate were 26 grams and 28 grams, respectively (the molar ratio being 1:1), 200 grams of N-, N-dimethylformamide was used instead of 160 grams of methyl cellosolve, the amount of azobisisobutyronitrile was 0.38 gram, the time period for the copolymerization reaction was 40 minutes, the liquid used for copolymerization product precipitation was water, and the liquid used for copolymerization product purification was acetone-water. The epoxy value of the resultant white colored solid polymer was 0.32.

The thus made polymer was treated in the same manner as in Example 1 to form a hygroscopic resin film of a thickness of 4 to 5 $\mu$m, and this resin film was subjected to the same measurements as in Example 1. The results of the measurements are shown in Table 1.

EXAMPLE 3

A hygroscopic resin of a white colored polymer was made in a manner quite similar to that of Example 1, except that here the amounts of 2-hydroxyethyl methacrylate and glycidyl methacrylate were 37 grams and 2 grams, respectively (the molar ratio being 20:1). The thus made polymer was treated in the same manner as in Example 1 to form a hygroscopic resin film of a thickness of 4 to 5 $\mu$m, and this resin film was subjected to the same measurements as in Example 1. The results of the measurements are shown in Table 1.

EXAMPLE 4

A hygroscopic resin of a white colored polymer was made in a manner quite similar to that of Exmaple 1, except that here the amounts of 2-hydroxyethyl methacrylate and glycidyl methacrylate were 26 grams and 14 grams, respectively (the molar ratio being 2:1). The thus made polymer was treated in the same manner as in Example 1 to form a hygroscopic resin film of a thickness of 4 to 5 $\mu$m, and this resin film was subjected to the same measurements as in Example 1. The results of the measurements are shown in Table 1.

EXAMPLE 5

A hygroscopic resin of a white colored polymer was made in a manner quite similar to that of Example 1, except that here the amounts of 2-hydroxyethyl methacrylate and glycidyl methacrylate were 39 grams and 10.5 grams, respectively (the molar ratio being 4:1). The thus made polymer was treated in the same manner as in Example 1 to form a hygroscopic resin film of a thickness of 4 to 5 $\mu$m, and this resin film was subjected to the same measurements as in Example 1. The results of the measurements are shown in Table 1.

EXAMPLE 6

A hygroscopic resin of a white colored polymer was made in the same manner as in Example 1. The thus made polymer was treated in a manner quite similar to that of Example 1 to form a hygroscopic resin film of a thickness of 4 to 5 $\mu$m, except that here to 100 weight parts of the polymer contained in the methyl cellosolve solution of 10% polymer, 5 weight parts of diaminodiphenylmethane was added. The thus formed hygroscopic resin film was subjected to the same measurements as in Example 1. The results of the measurements are shown in Table 1.

EXAMPLE 7

A hygroscopic resin of a white colored polymer was made in the same manner as in Example 3. The thus made polymer was treated in the same manner as in Example 6 to form a hygroscopic resin film of a thickness of 4 to 5 $\mu$m. The thus formed hygroscopic resin film was subjected to the same measurements as in Example 1. The results of the measurements are shown in Table 1.

EXAMPLE 8

A hygroscopic resin of a white colored polymer was made in a manner quite similar to that of Example 1, except that here 33 grams of N-vinylpyrrolidone was used instead of 37 grams of 2-hydroxyethyl methacrylate, the amount of glycidyl methacrylate was 14 grams (the molar ratio being 3:1), 200 grams of N-, N-dimethylformamide was used instead of 160 grams of methyl cellosolve, 0.24 gram of benzoylperoxide was used instead of 0.29 gram of azobisisobutyronitrile, the time period for the copolymerization reaction was 9 hours, the liquid used for copolymerization product precipitation was water, and the liquid used for copolymerization product purification was N,N-dimethylformamide-water. The epoxy value of the resultant white colored solid polymer was 0.2.

The thus made polymer was treated in the same manner as in Example 1 to form a hygroscopic resin film of a thickness of 4 to 5 $\mu$m, and this resin film was subjected to the same measurements as in Example 1. The results of the measurements are shown in Table 1.

EXAMPLES 9 to 16

Two kinds of monomers selected from the monomer groups A and B as shown in Table 2 (molar ratio being 10:1) were dissolved in 160 grams of methyl cellosolve in a 300ml flask provided with a cooling tube, a stirrer, a thermometer and an inlet for introducing nitrogen gas. 0.2 gram of azobisisobutyronitrile, as a catalyst for polymerization, was added to the solution. The solution was subjected to copolymerization reaction at a temperature of 80° C. for 5 hours and was treated thereafter in a manner quite similar to that of Example 1, to form a white colored polymer.

The thus made polymers were treated in the same manner as in Example 1 to form a hygroscopic resin films of a thickness of 4 to 5 $\mu$m, and these resin films were subjected to the same measurements as in Example 1. The results of the measurements are shown in Table 1.

In Table 2 monomer group A (a to g) represents (a) 2-hydroxyethyl acrylate, (b) diethyleneglycol monoacrylate, (c) diethyleneglycol monomethacrylate (d) 2-hydroxypropyl acrylate, (e) 3-hydroxypropyl methacrylate, (f) dipropyleneglycol monomethacrylate and (g) acrylamide, respectively. And monomer group B (x to z) represents (x) glycidyl acrylate, (y) glycidyl methacrylate and (z) glycidyl p-vinylbenzoate, respectively.

As apparent from Table 1, the hygroscopic resin according to this invention has high hydrophilic ability and can be controlled in its hydrophilicity by the composition of the copolymerization product and the component ratio in the copolymerization product. The hygroscopic resins according to this invention which are not shown in the above Examples also have the same features. The cross-linking in the hygroscopic resin according to this invention can be easily formed by heating and/or using a cross-linking reagent. The hygroscopic resin according to this invention is insoluble to water, and when it has cross-linking, it is substantially insoluble to organic solvents also. Thus, it is apparent that a stable hygroscopic resin having a long life can be obtained according to this invention. The hygroscopic resin of this invention can have other additives added thereto than those described above.

EXAMPLE 17

24 grams of 2-hydroxyethyl methacrylate and 6.5 grams of glycidyl methacrylate (the molar ratio being 4:1) were dissolved in 120 grams of methyl cellosolve, and 0.2 gram of azobisisobutyronitrile, as a catalyst for polymerization, was added to the solution. The solution was thus subjected to copolymerization reaction at 80° C. for 5 hours. The thus treated solution containing the copolymerization product was poured in to ethyl ether so as to precipitate the copolymerization product. The thus precipitated copolymerization product was purified in methanol-ethyl ether by reprecipitation, and was then dried at room temperature under reduced pressure (a few mm Hg), whereby a white colored solid polymer was obtained.

The thus made polymer (resin) was dissolved in methyl cellosolve. To the thus made solution, 0.6 weight part of a fine graphite powder having an average particle size of 0.5 μm was added on the basis of 1 weight part of the above made polymer, and the solution was well stirred to form a paste. This paste was coated on a surface of a ceramic substrate having a pair of comb-type carbon electrodes, and was then heated at 100° C. for 1 hour to cause a reaction in the coating so as to convert the coating into a solid film as a humidity sensor. FIG. 1 (A) and FIG. 1 (B) show the thus made humidity sensing device having the humidity sensor. Reference numeral 1 designates the substrate such as ceramic or plastic, reference numerals 2 and 3 designate the comb-type electrodes such as carbon or metal, reference numeral 4 designates the humidity sensor (the solid film polymer having the graphite powder dispersed therein), and reference numerals 5 and 6 designate a pair of electrical leads electrically connected to the electrodes 2 and 3, respectively.

Figure 2:
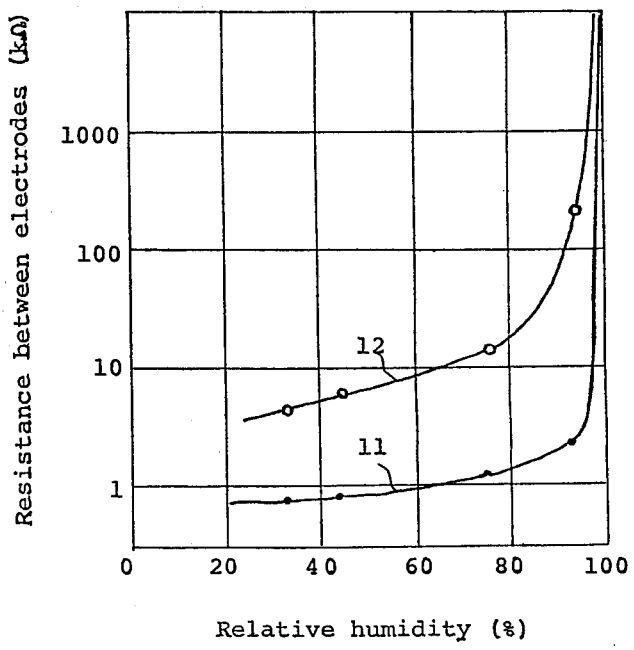
FIG. 2 is a graph showing the relation between the electrical resistance between the electrodes of the device of FIG. 1 and the ambient relative humidity under which the device of FIG. 1 is placed.

The relation between the relative humidity and the electrical resistance of the thus made humidity sensor (between the electrodes) with the temperature being kept at 20° C. is shown by curve 11 in FIG. 2. It was found that the reproducibility of the curve was good. Further, when the relative humidity was suddenly changed from 75% R. H. to 100% R. H., the electrical resistance changed from the value at 75% R. H. to the value at 100% R. H. within 10 to 20 seconds, whereby it was confirmed that the humidity sensor is quick in response to the humidity change. It was further found that the response to the humidity change because quicker as the thickness of the humidity sensor decreases.

Table 3 shows the measured electrical resistances of the humidity sensor at 54% R. H., 75% R. H., 94% R. H. and 100% R. H. with the temperature being kept at 20° C.

EXAMPLE 18

A white colored solid polymer was made in a manner quite similar to that of Example 17, except that here the molar ratio (of copolymerization) of 2-hydroxyethyl methacrylate to glycidyl methacrylate was made to be 10:1 instead of 4:1. The epoxy value of the thus made polymer was 0.064. By using this polymer, a humidity sensing device as of FIG. 1 was made in the same manner as in Example 17. Table 2 shows the measured electrical resistances of the thus made humidity sensor with the temperature being kept at 20° C.

EXAMPLE 19

A white colored solid polymer was made in a manner quite similar to that of Example 17, except that here the molar ratio of copolymerization was made to be 20:1 instead of 4:1. The epoxy value of the thus made polymer was 0.037. 1 weight part of this polymer and 0.05 weight part of diaminodiphenylmethane were dissolved in methyl cellosolve, and this solution was converted to a paste by dispersing therein a fine graphite powder having an average particle size of 0.5 μm. By using this paste, a humidity sensing device as of FIG. 1 was made in the same manner as in Example 17. Table 3 shows the measured electrical resistances of the thus made humidity sensor with the temperature being kept at 20° C.

EXAMPLE 20

A white colored solid polymer was made in the same manner as in Example 18. By using this polymer, a paste was made in a manner quite similar to that of Example 9, except that here the amount of the fine graphite powder was 0.4 weight part on the basis of 1 weight part of the polymer. by using this paste, a humidity sensing device as of FIG. 1 was made in the same manner as in Example 17. The relation between the relative humidity and the electrical resistance of the thus made humidity sensor with the temperature being kept at 20° C. is shown by curve 12 in FIG. 2. Further, Table 3 shows the measured electrical resistances of the humidity sensor with the temperature being kept at 20° C.

In the above Examples, a graphite powder was used as a conductive powder, but similar results can be obtained by using a carbon black, a gold powder, a silver powder or a mixture of these powders as the conductive powder. Further, other hygroscopic resins (copolymerization products) as defined above than those used in the above Examples can also be used to obtain similar results.

As apparent from the foregoing, the humidity sensor according to this invention is highly sensitive to humidity, particularly to humidity in the high humidity region, and is quick in response to the humidity change. Further, humidity sensor of this invention is highly reliable and can be easily made at a low cost.

Table 1

| Sample No. | $H_{(\cdot)}$ (%) at 33 % R. H. | at 54 % R. H. | at 75 % R. H. | at 94 % R. H. |
|---|---|---|---|---|
| Example 1 | 2.6 | 5.5 | 9.5 | 17.8 |
| Example 2 | 1.7 | 3.3 | 5.8 | 10.7 |
| Example 3 | 3.1 | 5.7 | 9.7 | 18.8 |
| Example 4 | 2.2 | 4.1 | 7.4 | 14.2 |
| Example 5 | 2.8 | 5.0 | 9.1 | 17.3 |
| Example 6 | 2.6 | 5.1 | 8.7 | 16.0 |
| Example 7 | 3.0 | 5.2 | 9.0 | 17.0 |
| Example 8 | 6.1 | 11.2 | 21.6 | 43.8 |
| Example 9 | 2.7 | 5.4 | 8.9 | 16.4 |
| Example 10 | 2.8 | 5.1 | 9.2 | 14.2 |
| Example 11 | 2.2 | 4.9 | 8.6 | 13.8 |
| Example 12 | 2.6 | 5.6 | 9.3 | 17.2 |
| Example 13 | 3.0 | 5.3 | 9.9 | 16.0 |
| Example 14 | 1.9 | 3.2 | 6.2 | 12.3 |
| Example 15 | 2.4 | 3.8 | 8.0 | 11.4 |
| Example 16 | 4.0 | 5.9 | 9.8 | 19.8 |

Table 2

| Example No. | Monomer A | Monomer B | Epoxy value of copolymer |
|---|---|---|---|
| 9 | a, 23 g | x, 2.6 g | 0.063 |
| 10 | b, 32 g | y, 2.8 g | 0.071 |
| 11 | c, 35 g | y, 2.8 g | 0.073 |
| 12 | d, 26 g | y, 2.8 g | 0.068 |

Table 2-continued

| Example No. | Monomer A | Monomer B | Epoxy value of copolymer |
|---|---|---|---|
| 13 | e, 30 g | y, 2.8 g | 0.067 |
| 14 | f, 38 g | y, 2.8 g | 0.070 |
| 15 | a, 23 g | z, 4.1 g | 0.066 |
| 16 | g, 14 g | z, 4.1 g | 0.049 |

Table 3

| | Electrical Resistance (kΩ) | | | |
|---|---|---|---|---|
| Sample No. | at 54 % R. H. | at 75 % R. H. | at 94 % R. H. | at 100 % R. H. |
| Example 17 | 0.9 | 1.2 | 2.4 | 5000 |
| Example 18 | 1.0 | 1.4 | 6.4 | 3000 |
| Example 19 | 0.9 | 1.2 | 3.2 | 2000 |
| Example 20 | 6.4 | 13.5 | 185 | 1000 |

What is claimed is:

1. A humidity sensor comprising a hygroscopic resin, which resin comprises a vinyl polymer having epoxy group, said vinyl polymer being a copolymerization product of (a) a hydrophylic vinyl monomer selected from the group consisting of 2-hydroxyethyl acrylate and 2-hydroxyethyl methacrylate and (b) a further vinyl monomer having an epoxy group and being selected from the group consisting of glycidyl acrylate and glycidyl methacrylate, the amount of said further vinyl monomer being from 1 to 30 mole percent on the basis of the weight of said copolymerization product, said hygroscopic resin having a electrically conductive powder dispersed therein, the amount of said electrically conductive powder being from 30 to 100 weight parts on the basis of 100 weight parts of said hygrosopic resin.

2. A humidity sensor according to claim 1, which further has added hereto a cross-linking reagent which reacts with said hygroscopic resin.

3. A humidity sensor comprising a hygroscopic resin according to claim 1, said hygroscopic resin having graphite as the electrically conductive powder dispersed therein, the amount of said graphite power being 30 to 100 weight parts on the basis of 100 weight parts of said hygroscopic resin.

4. A humidity sensor according to claim 3, which further has added hereto a cross-linking reagent which reacts with said hygroscopic resin.

* * * * *